United States Patent
Kim et al.

(10) Patent No.: US 12,018,876 B2
(45) Date of Patent: Jun. 25, 2024

(54) THERMAL MANAGEMENT SYSTEM FOR VEHICLE INCLUDING EJECTOR

(71) Applicants: HYUNDAI MOTOR COMPANY, Seoul (KR); KIA CORPORATION, Seoul (KR)

(72) Inventors: Jong Won Kim, Cheonan-si (KR); Sang Shin Lee, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 64 days.

(21) Appl. No.: 17/946,273

(22) Filed: Sep. 16, 2022

(65) Prior Publication Data

US 2023/0194130 A1  Jun. 22, 2023

(30) Foreign Application Priority Data

Dec. 22, 2021  (KR) .................. 10-2021-0185033

(51) Int. Cl.
*F25B 9/08* (2006.01)
*B60H 1/32* (2006.01)
*F25B 41/42* (2021.01)

(52) U.S. Cl.
CPC ........... *F25B 9/08* (2013.01); *B60H 1/32281* (2019.05); *F25B 41/42* (2021.01); *B60H 2001/3298* (2013.01); *F25B 2400/23* (2013.01)

(58) Field of Classification Search
CPC ........ F25B 9/08; F25B 41/42; F25B 2400/23; F25B 2400/0415; F25B 2400/16;
(Continued)

(56) References Cited

U.S. PATENT DOCUMENTS 9,200,820 B2  12/2015  Okazaki et al.
2006/0254308 A1*  11/2006  Yokoyama ............. F25D 21/08
62/500

(Continued)

FOREIGN PATENT DOCUMENTS

EP  2942585 B1  3/2021
JP  2005-037114 A  2/2005

(Continued)

OTHER PUBLICATIONS

English translation of Ikegami (JP-2005249315-A). (Year: 2005).*

(Continued)

*Primary Examiner* — Miguel A Diaz
(74) *Attorney, Agent, or Firm* — MCDONNELL BOEHNEN HULBERT & BERGHOFF LLP

(57) ABSTRACT

A thermal management system for a vehicle includes an ejector, which includes a main refrigerant line connected to allow a refrigerant to sequentially circulate through a compressor, a condenser and an evaporator, a first branch line which branches between the condenser and the evaporator of the main refrigerant line and which is connected to an inside of the nozzle of the ejector, a second branch line which branches between the evaporator and the compressor of the main refrigerant line and which is connected to an outside of the nozzle of the ejector, and a refrigerant increase line which is connected to an outlet of the ejector and which joins to the main refrigerant line through the compressor.

8 Claims, 15 Drawing Sheets

(58) Field of Classification Search
CPC ............ F25B 2400/0407; F25B 43/006; F25B 2341/00; F25B 2341/001; F25B 2341/0012; B60H 1/32281; B60H 2001/3298
See application file for complete search history.

(56) References Cited

U.S. PATENT DOCUMENTS

2006/0266072 A1   11/2006   Takeuchi et al.
2019/0070924 A1   3/2019   Mancini et al.

FOREIGN PATENT DOCUMENTS

| JP | 2005249315 A | * | 9/2005 |
|----|---|---|---|
| KR | 2009-0119559 A | | 11/2009 |
| KR | 2011-0129579 A | | 12/2011 |
| KR | 10-1503012 B1 | | 3/2015 |
| KR | 10-1658030 B1 | | 9/2016 |

OTHER PUBLICATIONS

Jianyong Chen, et al. (2014). Investigation of ejectors in refrigeration system: Optimum performance evaluation and ejector area ratios perspectives. Applied Thermal Engineering. 64: 182-191.

Jung-In Yoon, et al. (2017). Performance Characteristics of Refrigeration Cycles with Ejector using Refrigerants. Journal of the Korean Society for Power System Engineering. 21(1): 24-29.

Jeong Taek Lim, et al. (2019). Performance Analysis of Combined Cycle of Ejector and Gas Injection in a Mobile Heat Pump System with Electric Scroll Compressor. Korean Journal of Air-Conditioning and Refrigeration Engineering. 31(9):420-432.

* cited by examiner

<OPEN>

<Close>

THERMAL MANAGEMENT SYSTEM FOR VEHICLE INCLUDING EJECTOR

CROSS REFERENCE TO RELATED APPLICATIONS

The present application claims priority of Korean Patent Application No. 10-2021-0185033 filed on Dec. 22, 2021, the entire contents of which is incorporated herein for all purposes by this reference.

BACKGROUND

Field of the Disclosure

The present disclosure relates to a thermal management system for a vehicle including an ejector, and more specifically, to technology of a thermal management system to which a refrigeration cycle is applied with an injection function which supplies a refrigerant of a relatively high temperature/high pressure in a gas phase to a compressor so as to compensate for a problem of the refrigeration cycle to which an ejector is applied.

Description of the Related Art

Recently, due to environmental issues of internal combustion engine vehicles, electric vehicles and the like have been widely used as eco-friendly vehicles. However, in the case of an existing internal combustion engine vehicle, an interior of the vehicle can be heated through waste heat of the engine, and thus no separate heating energy is required. However, since there is no engine in electric vehicles and there is no heat source, heating is performed through a separate energy so that there is problem of decreasing fuel efficiency. In addition, due to the above problem, a driving available range of the electric vehicle is shortened so that there is inconvenience of requiring frequent charging.

Meanwhile, due to electrification of a vehicle, not only an interior of the vehicle, but also thermal management needs of electronic components such as high voltage batteries and motors have been newly added. That is, in the electric vehicle and the like, the needs for air conditioning are different for an indoor space, the battery, and the electronic component, and a technology capable of independently responding to and effectively collaborating the indoor space, the battery, and the electronic component to save energy as much as possible is needed. Accordingly, an integrated thermal management concept of a vehicle has been proposed to increase thermal efficiency by integrating entire thermal management of the vehicle while performing independently thermal management for each component.

In order to perform the integrated thermal management of a vehicle, it is necessary to integrate and modularize complicated cooling water lines and parts. It is necessary to modularize a plurality of parts while simplifying manufacturing, and a concept of compact modularization in terms of packaging is necessary.

Recently, research for increasing efficiency of a refrigeration cycle (heat pump) in the electric vehicle is being actively carried out. Research on application of an ejector or injection for high-performance of the refrigeration cycle is being actively carried out.

A refrigeration cycle, to which the conventional ejector is applied, has a structure in which a refrigerant condensed in a condenser flows to a gas-liquid separator using a compression recovery function utilizing a venturi effect of the ejector, and a refrigeration cycle, and the refrigerant in a liquid phase circulates through an expansion valve and an evaporator. Accordingly, there is an effect of reducing power consumption (work) of the compressor and increasing a refrigerant flow rate when compared with a general refrigeration cycle.

However, the refrigeration cycle to which the conventional ejector is applied has a problem in that it is difficult to secure an additional refrigerant flow rate in a low temperature state.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a technology of a thermal management system for a vehicle including a refrigeration cycle in which an injection function for supplying a refrigerant of relatively high temperature/high pressure in a gas phase to the compressor is additionally applied to a refrigeration cycle to which a conventional ejector is applied.

According to one aspect, there is provided a thermal management system for a vehicle including an ejector, which includes a main refrigerant line connected to allow a refrigerant to sequentially circulate through a compressor, a condenser and an evaporator, a first branch line which branches between the condenser and the evaporator of the main refrigerant line and which is connected to an inside of the nozzle of the ejector, a second branch line which branches between the evaporator and the compressor of the main refrigerant line and which is connected to an outside of the nozzle of the ejector, and a refrigerant increase line which is connected to an outlet of the ejector and which joins to the main refrigerant line through the compressor.

A gas-liquid separator may be provided between the evaporator and the compressor of the main refrigerant line, and the second branch line may branch from the gas-liquid separator of the main refrigerant line.

A refrigerant in a gas phase separated in the gas-liquid separator may flow to the main refrigerant line, and a refrigerant of a liquid phase separated in the gas-liquid separator or a refrigerant in a mixed state of a liquid phase and a gas phase may flow in the second branch line.

The compressor of the main refrigerant line may be a compressor for two-stage compression, in which a refrigerant in a gas phase is additionally injected into an intermediate compression region and the refrigerant is mixed.

A first chiller connected to the evaporator in parallel so as to bypass the evaporator and configured to exchange heat with cooling water of the first cooling circuit may be provided on the main refrigerant line.

A second chiller in which the refrigerant discharged from the outlet of the ejector exchanges heat with cooling water of a second cooling circuit may be provided on the refrigerant increase line.

The thermal management system may further include a recycle line which branches between the compressor and the condenser of the main refrigerant line or branches from the refrigerant increase line and joins to the first branch line at an inlet of the nozzle of the ejector.

An adjustment valve for controlling a flow direction of the refrigerant may be provided at a branching point from the main refrigerant line to the first branch line, and when the refrigerant flows through the recycle line, the adjustment valve may block a flow of the refrigerant from the main refrigerant line to the first branch line.

The main refrigerant line at a point before branching to the first branch line and the refrigerant increase line at a point before joining to the compressor pass through a heat exchanger in which the main refrigerant line and the refrigerant increase line may be disposed to exchange heat with each other.

The ejector may be an electric ejector in which an opening degree amount of a nozzle is adjustable due to driving of the actuator.

BRIEF DESCRIPTION OF THE FIGURES

The above and other objects, features and other advantages of the present disclosure will be more clearly understood from the following detailed description when taken in conjunction with the accompanying drawings, in which.

DETAILED DESCRIPTION

Figure 1:
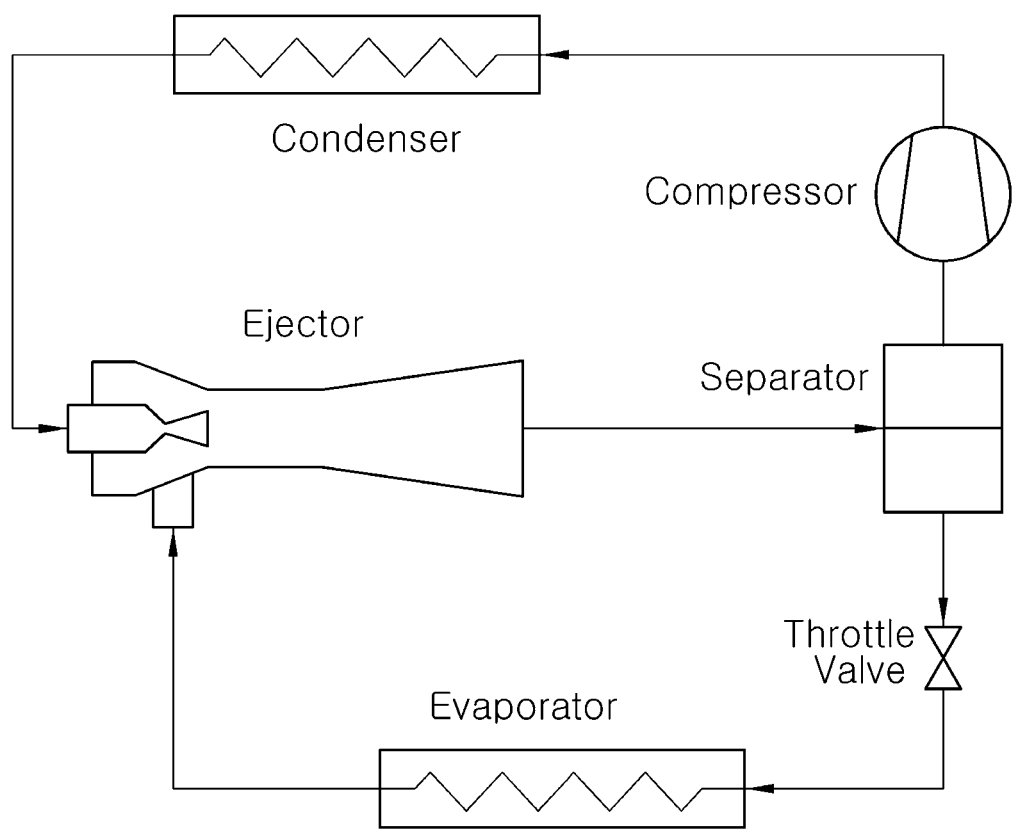
FIG. 1 is a circuit diagram illustrating a refrigeration cycle to which an ejector is applied according to the related art.

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present disclosure. Unless the context clearly dictates otherwise, the singular form includes the plural form. In the present specification, the terms "comprising," "having," or the like are used to specify that a feature, a number, a step, an operation, a component, an element, or a combination thereof described herein is present, and it should be understood that the terms do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed to have meanings that are consistent in the context of the relevant art and will not be interpreted as having an idealistic or excessively formalistic meaning unless clearly defined in the present specification.

Hereinafter, exemplary embodiments of the present disclosure will be described in detail with reference to the accompanying drawings. The same reference numerals in each drawing indicate the same members.

Figure 2:
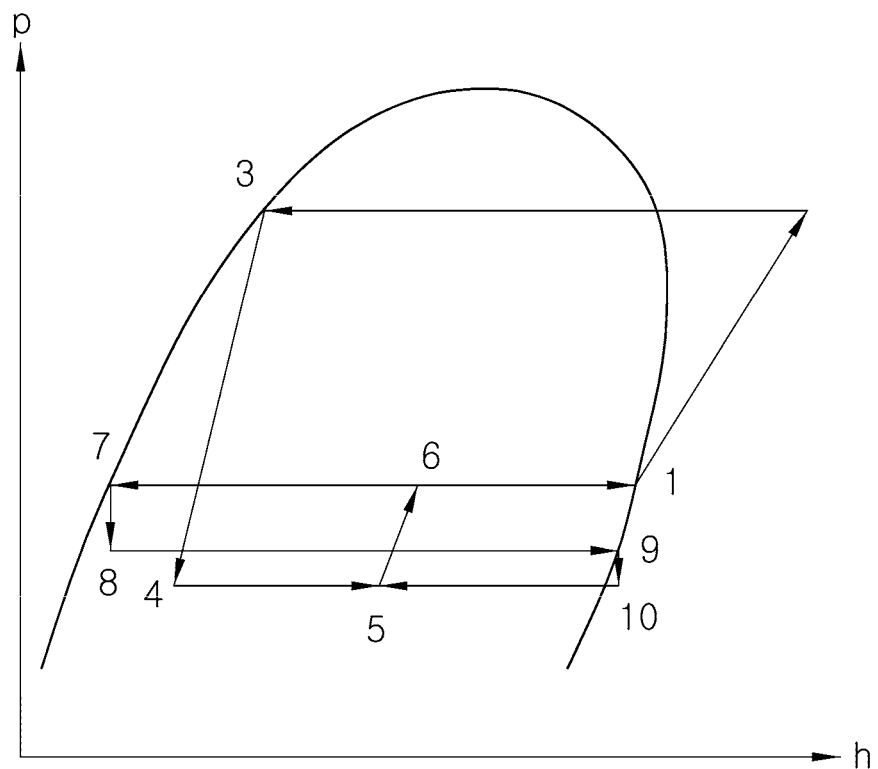
FIG. 2 is a P-h graph illustrating the refrigeration cycle to which the ejector is applied according to the related art.
Figure 3:
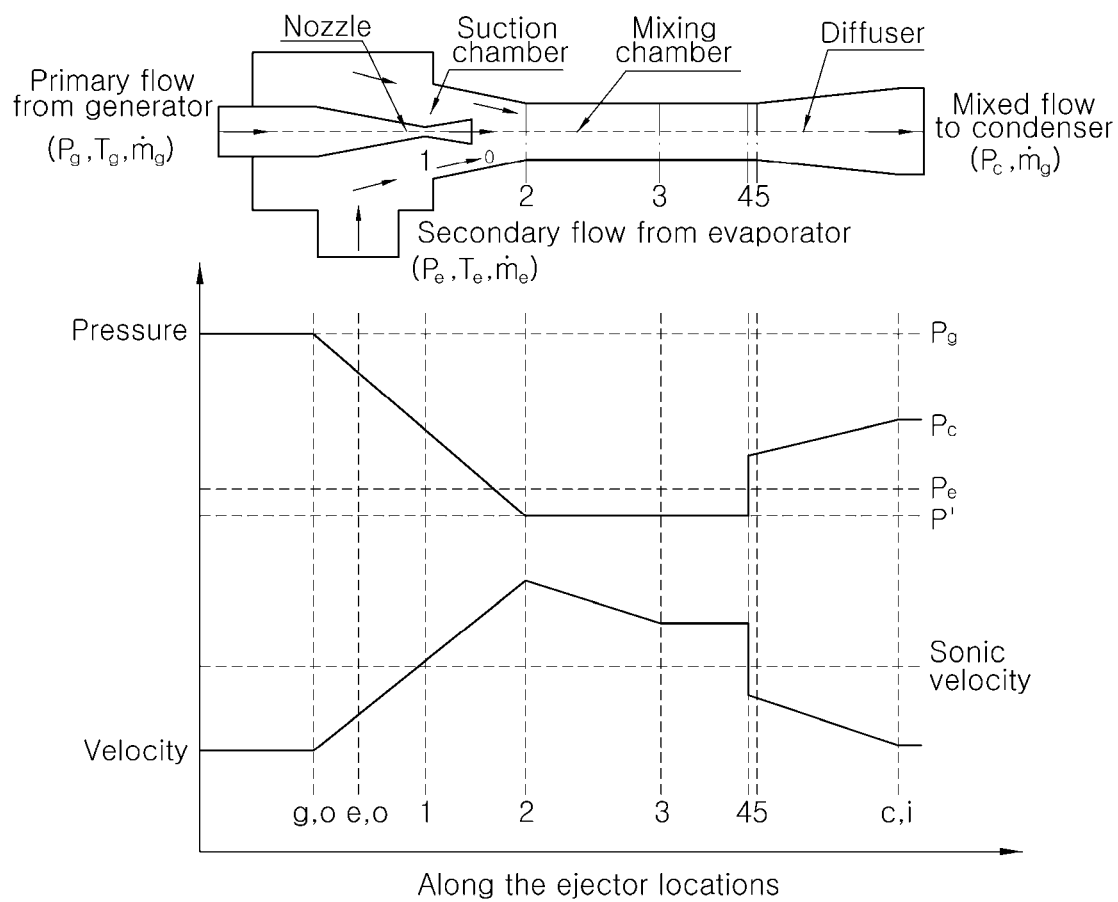
FIG. 3 a diagram illustrating an operating principle of an ejector included in the refrigeration cycle to which the ejector is applied according to the related art.

FIG. 1 is a circuit diagram illustrating a refrigeration cycle to which an ejector is applied according to the related art, FIG. 2 is a P-h graph illustrating the refrigeration cycle to which the ejector is applied according to the related art, and FIG. 3 a diagram illustrating an operating principle of an ejector included in the refrigeration cycle to which the ejector is applied according to the related art.

Referring to FIGS. 1 to 3, in the refrigeration cycle to which the ejector is applied according to the related art, a refrigerant is condensed in a condenser and is separated in a gas-liquid separator, and the refrigerant in a liquid phase is circulated to the ejector again through an expansion valve and an evaporator, and a refrigerant in a gas phase is circulated to the condenser through the compressor.

The ejector is a type of pump which moves a fluid around a nozzle by ejecting a fluid such as water, steam, or air having a pressure from the nozzle at high speed. Specifically, in the refrigeration cycle to which the ejector is applied, the low temperature and high pressure refrigerant discharged from the condenser flows into the nozzle of the ejector, and thus the low temperature and low pressure refrigerant discharged from the evaporator flows into the outside of the nozzle of the ejector.

That is, since a compression recovery function is generated according to the venturi effect of the ejector and thus power consumption (work) of the compressor is reduced, a coefficient of performance (COP) of the refrigeration cycle is increased and an additional refrigerant is introduced so that there is an effect of increasing a flow rate of the refrigerant when compared to the general refrigeration cycle.

However, the refrigeration cycle to which the ejector is applied has a problem in that it is difficult to introduce an additional refrigerant in a low temperature region so that it is difficult to additionally secure a refrigerant flow rate.

A refrigeration cycle to which an injection function for supplying a relatively high temperature/high pressure refrigerant in a gas phase to the compressor is applied is divided into gas injection and liquid injection.

In the refrigeration cycle to which gas injection is applied, a refrigerant flows to the evaporator through a two-stage expansion process, and a primarily expanded refrigerant of a medium pressure in a gas phase is injected into the compressor. Accordingly, a flow rate of the refrigerant flowing to an outdoor condenser, an indoor condenser, or the compressor is increased, a compression effect is improved by a two-stage compression, and thus there is an effect of reducing power consumption of the compressor. In particular, it is possible to solve degradation of performance of the refrigeration cycle in cold regions and tropical regions.

On the other hand, the refrigeration cycle to which the liquid injection is applied has an effect of preventing overheating of the compressor and, simultaneously, absorbing heat consumed by the compressor to additionally increase a flow rate of the refrigerant.

Specifically, in the case of a heat exchanger type, a portion of the refrigerant is separated at a rear end of the outdoor condenser or the indoor condenser and is heat exchanged with a primarily expanded refrigerant of a medium pressure. Accordingly, the separated refrigerant is vaporized and, simultaneously, is secondarily expanded to reduce dryness of the refrigerant flowing into the evaporator.

In addition, in the case of a gas-liquid separator type, a refrigerant is entirely expanded at the rear end of the outdoor condenser or the indoor condenser, and then the refrigerant is separated into a refrigerant in a gas phase and a refrigerant in a liquid phase to flow to the compressor and a secondary expansion valve. Accordingly, the refrigerant in a liquid phase is separated and is secondarily expanded to reduce dryness of the refrigerant flowing into the evaporator.

The thermal management system for a vehicle including an ejector according to the present disclosure includes a refrigeration cycle which utilizes the ejector and, simultaneously, to which an injection for supplying a refrigerant of a relatively high temperature/high pressure in a gas phase to the compressor is applied so that the refrigeration cycle is an ejector & injection hybrid refrigeration cycle.

Figure 4:
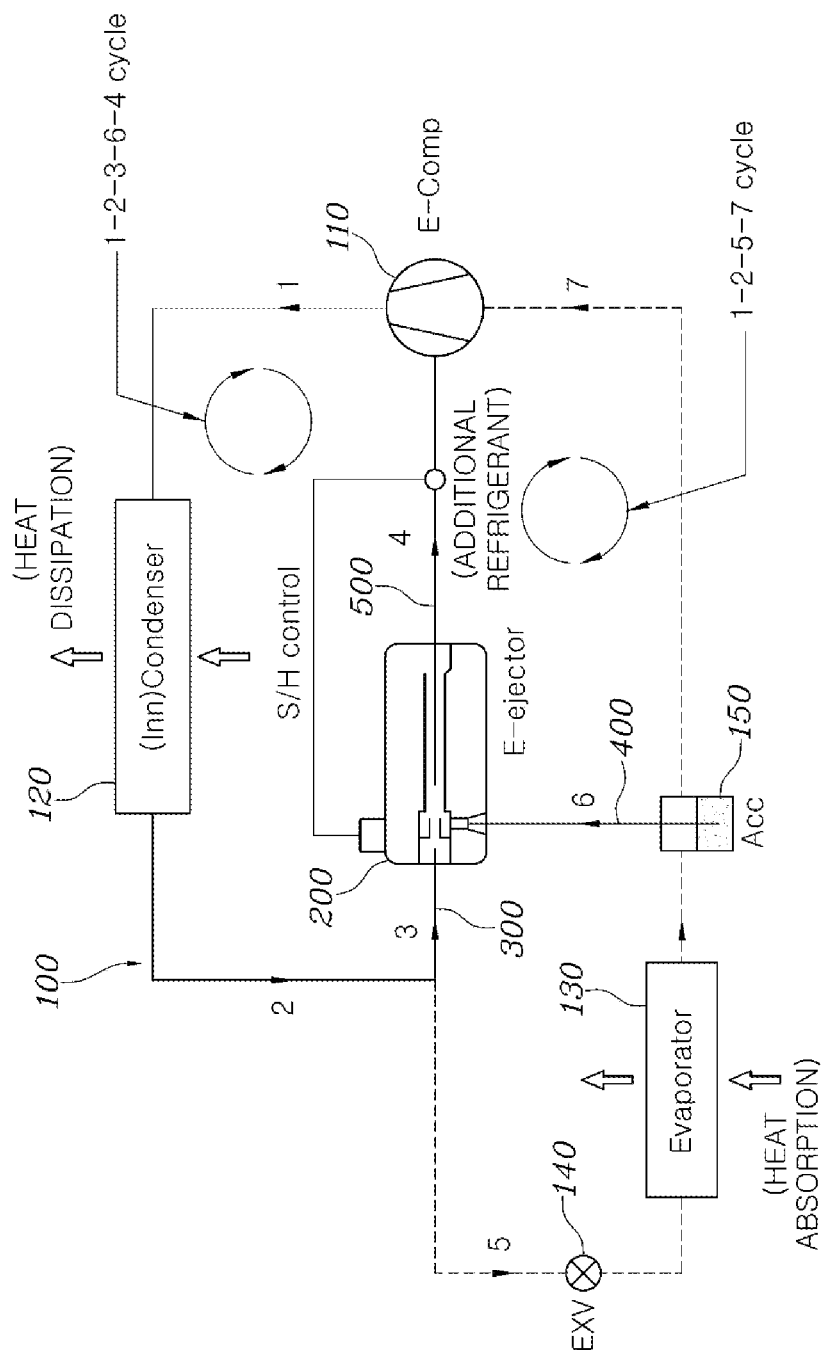
FIG. 4 is a circuit diagram illustrating a thermal management system for a vehicle including an ejector according to one embodiment of the present disclosure.
Figure 5:
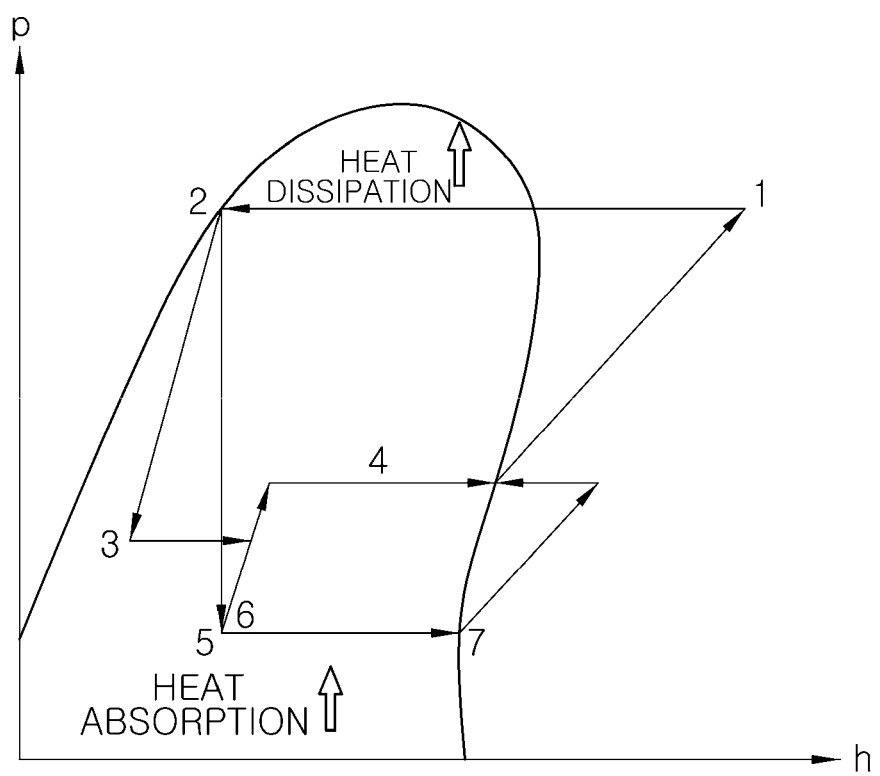
FIG. 5 is a P-h graph illustrating the thermal management system including an ejector according to one embodiment of the present disclosure.

FIG. 4 is a circuit diagram of a thermal management system for a vehicle including an ejector 200 according to one embodiment of the present disclosure, and FIG. 5 is a P-h graph illustrating the thermal management system including the ejector 200 according to one embodiment of the present disclosure.

Referring to FIGS. 4 and 5, the thermal management system for a vehicle including the ejector 200 according to one embodiment of the present disclosure includes a main refrigerant line 100 connected to allow a refrigerant to sequentially circulate through a compressor 110, a condenser 120, and an evaporator 130, a first branch line 300 which branches between the condenser 120 and the evaporator 130 of the main refrigerant line 100 and which is connected to an inside of a nozzle 230 of the ejector 200, a second branch line 400 which branches between the evaporator 130 and the compressor 110 of the main refrigerant line 100 and which is connected to an outside of the nozzle 230 of the ejector 200, and a refrigerant increase line 500 connected to an outlet of ejector 200 and joining to the main refrigerant line 100 via the compressor 110.

The main refrigerant line 100 may employ the same refrigeration cycle as a general refrigeration cycle. The main refrigerant line 100 may be connected to allow the refrigerant to flow therein and sequentially circulate through the compressor 110, the condenser 120, and the evaporator 130. Specifically, the refrigerant of a low temperature and low pressure is compressed in the compressor 110 as a refrigerant of a high temperature and high pressure and then is cooled as a refrigerant of a low temperature and high pressure while passing through the condenser 120. The refrigerant of a low temperature and high pressure passing through the condenser 120 may be decompressed as a refrigerant of a low temperature and low pressure while passing through the evaporator 130.

Here, the condenser 120 may be an indoor condenser 120 for air conditioning of the vehicle and, according to another embodiment, the condenser 120 may be an outdoor condenser 120 disposed an outside of the vehicle.

An expansion valve 140 may be further provided in the evaporator 130 to expand the refrigerant of a low temperature and high pressure in a liquid phase before flowing into the evaporator 130.

The ejector 200 of the present disclosure may receive the refrigerant through the first branch line 300 and the second branch line 400, which branch in a parallel structure from the main refrigerant line 100, and the refrigerant may join back into the main refrigerant line 100 through the refrigerant increase line 500. According to the above configuration of the ejector 200, the refrigerant of the second branch line 400, which has a relatively low pressure, is suctioned using the pressure of the first branch line 300 without additional power, and the refrigerant is supplied to the compressor 110 of the main refrigerant line 100 through the refrigerant increase line 500 so that there is an effect of increasing a flow rate of the flowing refrigerant.

More specifically, the first branch line 300 branches in a parallel structure from the main refrigerant line 100 at a point before flowing to the evaporator 130 by passing through the condenser 120 so that the refrigerant of a low temperature and high pressure may flow. In addition, the second branch line 400 branches from the main refrigerant line 100 at a point before flowing to the compressor 110 by passing through the evaporator 130 so that the refrigerant of a low temperature and low pressure may flow.

In particular, the refrigerant of the first branch line 300 may be supplied to an inside of the nozzle 230 of the ejector 200 and a flow rate of the refrigerant may be increased to reduce a pressure, and the refrigerant of the second branch line 400 may be suctioned to the outside of the nozzle 230 through a suction port of the ejector 200. The refrigerant of the first branch line 300 and the refrigerant of the second branch line 400 may be mixed with each other and then may be discharged to the refrigerant increase line 500 through the outlet of the ejector 200 having a diffuser shape. The refrigerant increase line 500 connected to the outlet of the ejector 200 may join to the main refrigerant line 100 through the compressor 110.

A gas-liquid separator 150 may be provided between the evaporator 130 and the compressor 110 of the main refrigerant line 100, and the second branch line 400 may branch from the gas-liquid separator 150 of the main refrigerant line 100.

The gas-liquid separator 150 may separate the refrigerant of a low temperature and low pressure, which passes through the evaporator 130 of the main refrigerant line 100, into a refrigerant in a liquid phase and a refrigerant in a gas phase. In particular, since the second branch line 400 branching from the main refrigerant line 100 may be connected to the gas-liquid separator 150, the second branch line 400 may branch from the main refrigerant line 100 in a state in which the refrigerant in a liquid phase and the refrigerant in a gas phase are separated.

More specifically, the refrigerant in a gas phase, which is separated in the gas-liquid separator 150, may flow to the main refrigerant line 100, and the refrigerant in a liquid phase separated in the gas-liquid separator 150 or a refrigerant in a mixed state of the liquid phase and the gas phase may flow in the second branch line 400.

The refrigerant in a gas phase separated from an upper portion of the gas-liquid separator 150 may flow to the compressor 110 of the main refrigerant line 100, and the refrigerant in a liquid phase separated from a lower portion of the gas-liquid separator 150 or the refrigerant in the mixed state of the liquid phase and the gas phase may flow to the second branch line 400.

The compressor 110 of the main refrigerant line 100 may be a two-stage compressive compressor 110 in which a refrigerant in a gas phase is additionally injected into an intermediate compression region and mixed.

Specifically, the compressor 110 is a two-stage compressor 110 for injection in which an injection port, through which the refrigerant flowing by passing through the evaporator 130 of the main refrigerant line 100 is introduced, and an injection port, through which a refrigerant of a medium pressure in a gas phase is injected in the intermediate compression region, are separately formed, and thus the refrigerants are mixed.

According to the thermal management system for a vehicle including the ejector 200 according to one embodiment of the present disclosure, the flow rate of the refrigerant is increased by applying the ejector 200, and a compression ratio and power consumption (work) due to a pressure recovery function are reduced so that there is an effect of increasing a COP and, simultaneously, the injection function is utilized so that there is an effect of increasing the flow rate of the refrigerant even in a low temperature region and configuring two refrigeration cycles using one refrigerant circuit.

Figure 6:
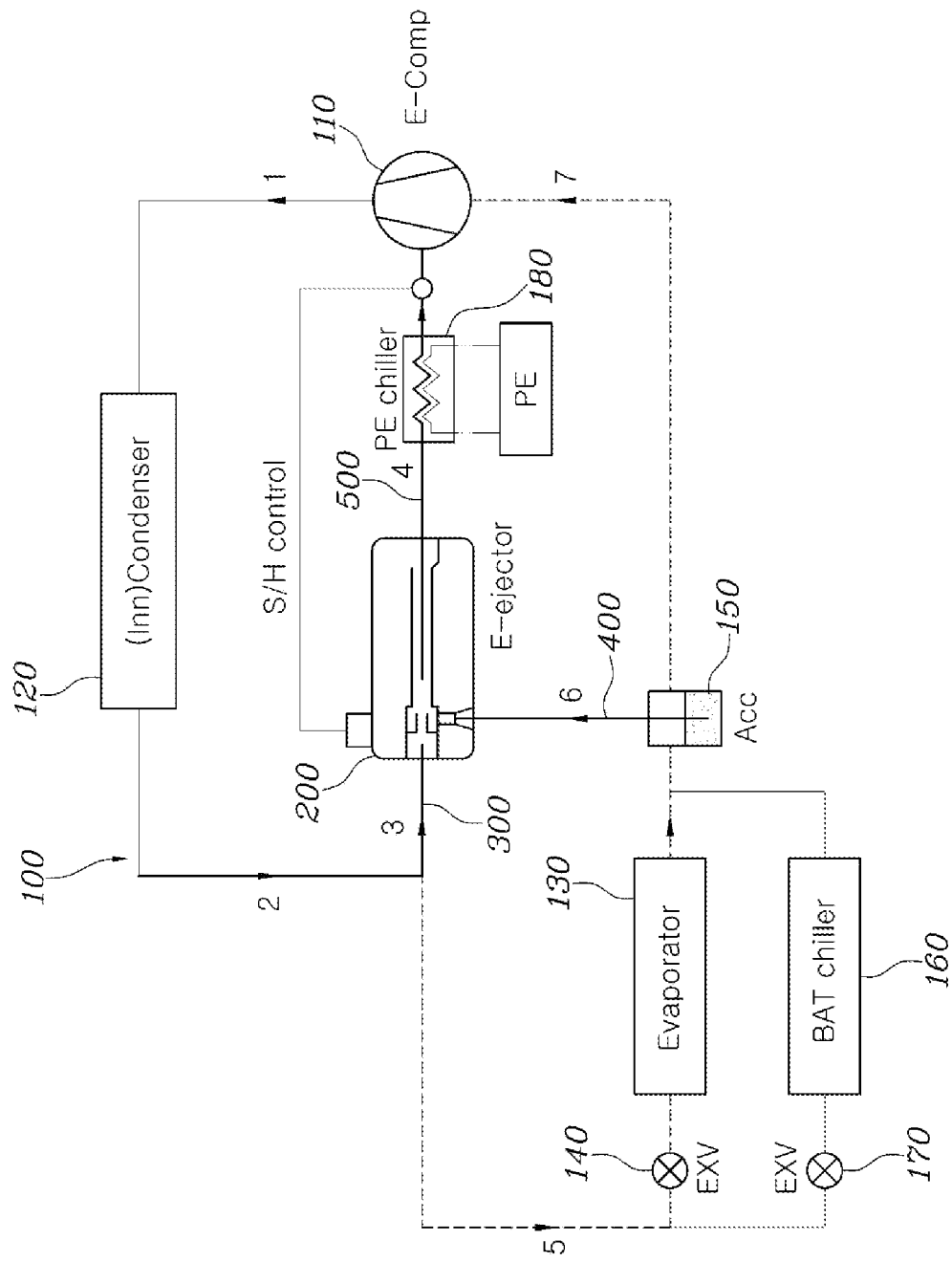
FIG. 6 is a circuit diagram illustrating a thermal management system for a vehicle including an ejector according to another embodiment of the present disclosure.
Figure 7:
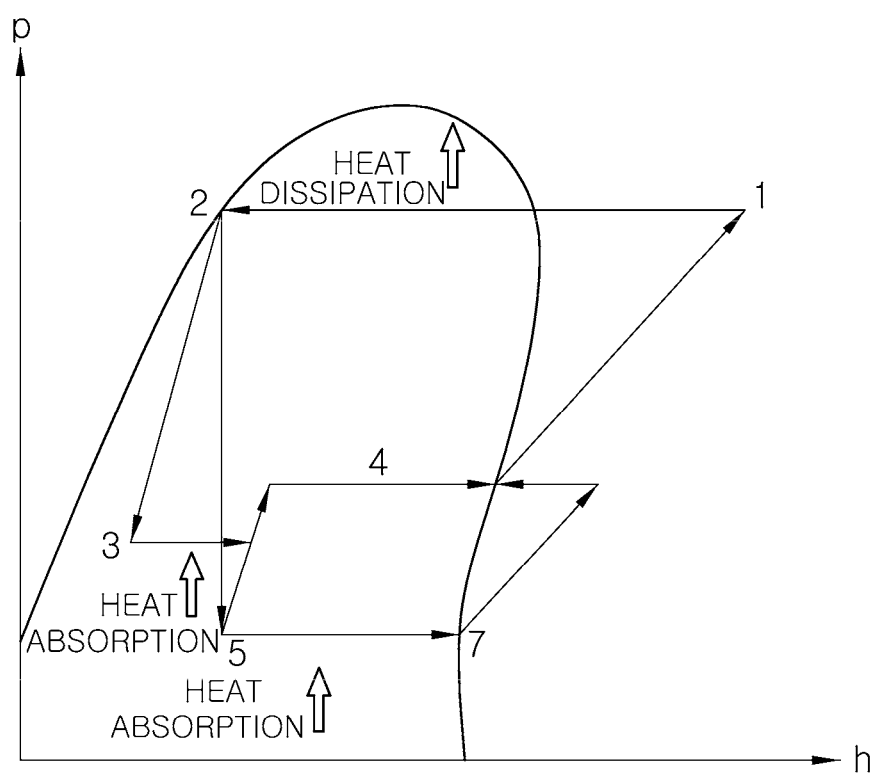
FIG. 7 is a P-h graph illustrating the thermal management system including an ejector according to another embodiment of the present disclosure.

FIG. 6 is a circuit diagram of the thermal management system for a vehicle including an ejector 200 according to another embodiment of the present disclosure, and FIG. 7 is a P-h graph illustrating the thermal management system including the ejector 200 according to another embodiment of the present disclosure.

Referring to FIGS. 6 and 7, the thermal management system for a vehicle including the ejector 200 according to another embodiment of the present disclosure may use a heat exchanger type cycle which additionally has a heat absorption process.

Specifically, the main refrigerant line 100 may be provided with a first chiller 160 which is connected to the evaporator 130 in parallel to bypass the evaporator 130 and heat-exchanges with cooling water of a first cooling circuit.

The first chiller 160 is provided to be connected to the main refrigerant line 100 in parallel together with the evaporator 130, and the expansion valve 140 may be included before the evaporator 130. Here, the expansion valve 140 may be provided and shared at a point before branching into the evaporator 130 and the first chiller 160, or the expansion valves 140 and 170 may be provided at inlets of the evaporator 130 and the first chiller 160, respectively. A flow of the refrigerant to the evaporator 130 or the first chiller 160 may be controlled by controlling an opening/closing of the expansion valves 140 and 170 provided in the evaporator 130 and the first chiller 160.

In addition, the refrigerant increase line 500 may be provided with a second chiller 180 in which the refrigerant discharged from an outlet of the ejector 200 exchanges heat with cooling water of a second cooling circuit.

The second chiller 180 may be provided to be connected to the refrigerant increase line 500 in series between the ejector 200 and the compressor 110. The first chiller 160 and the second chiller 180 are components which are connected to each other and which allow the cooling water and the refrigerant to exchange heat with each other.

As one example, the first cooling circuit may be a battery cooling circuit for cooling a battery mounted in a vehicle, and the second cooling circuit may be an electrical part cooling circuit for cooling electrical parts such as a driving motor which drives the vehicle. In another example, the first cooling circuit may be an electrical part cooling circuit, and the second cooling circuit may be a battery cooling circuit.

Accordingly, it is possible to additionally secure a heat absorption section of the refrigeration cycle, and thus there is an effect of additionally securing a flow rate and a heat amount of the refrigerant in a gas phase of the thermal management system.

Figure 8:
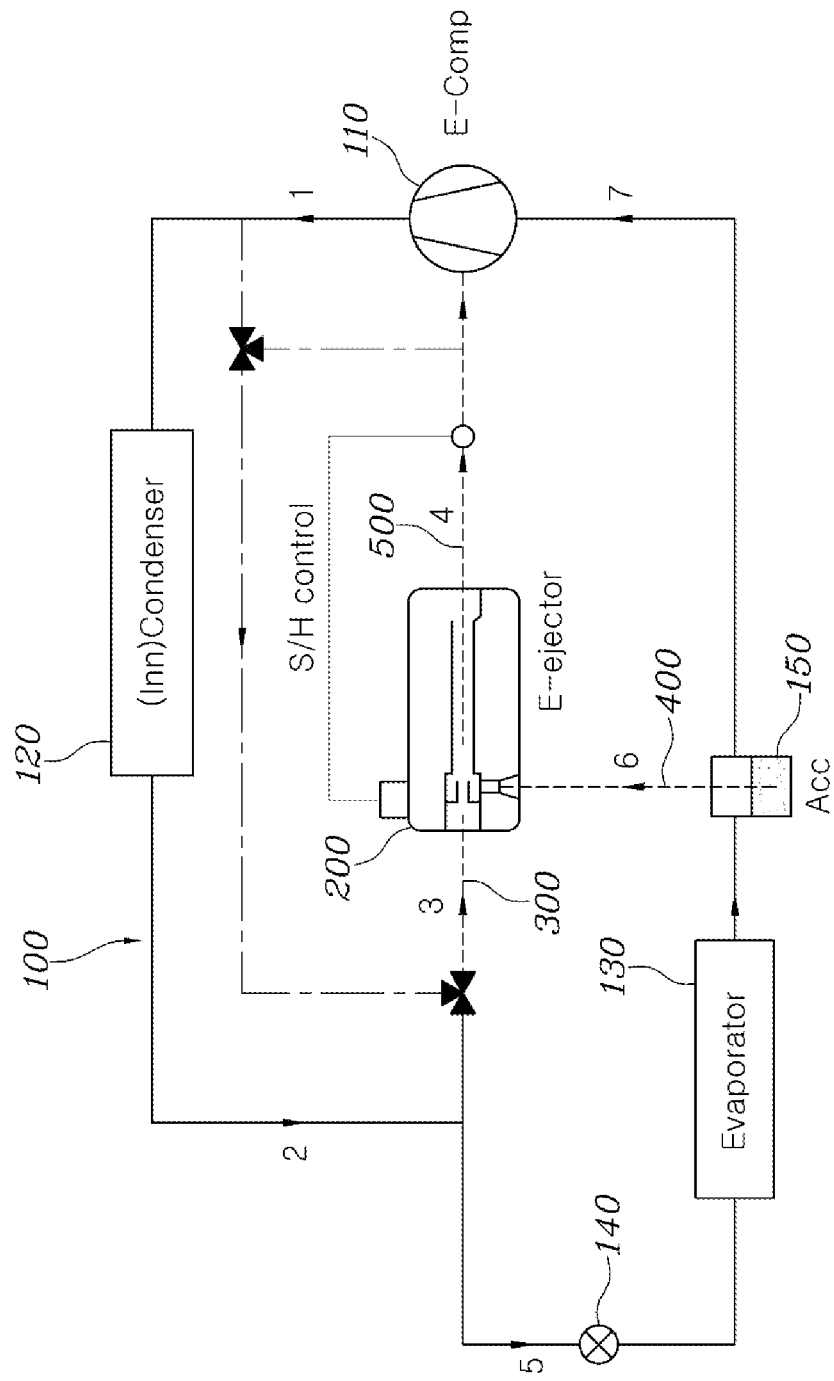
FIG. 8 is a circuit diagram illustrating a thermal management system for a vehicle including an ejector according to still another embodiment of the present disclosure.
Figure 9:
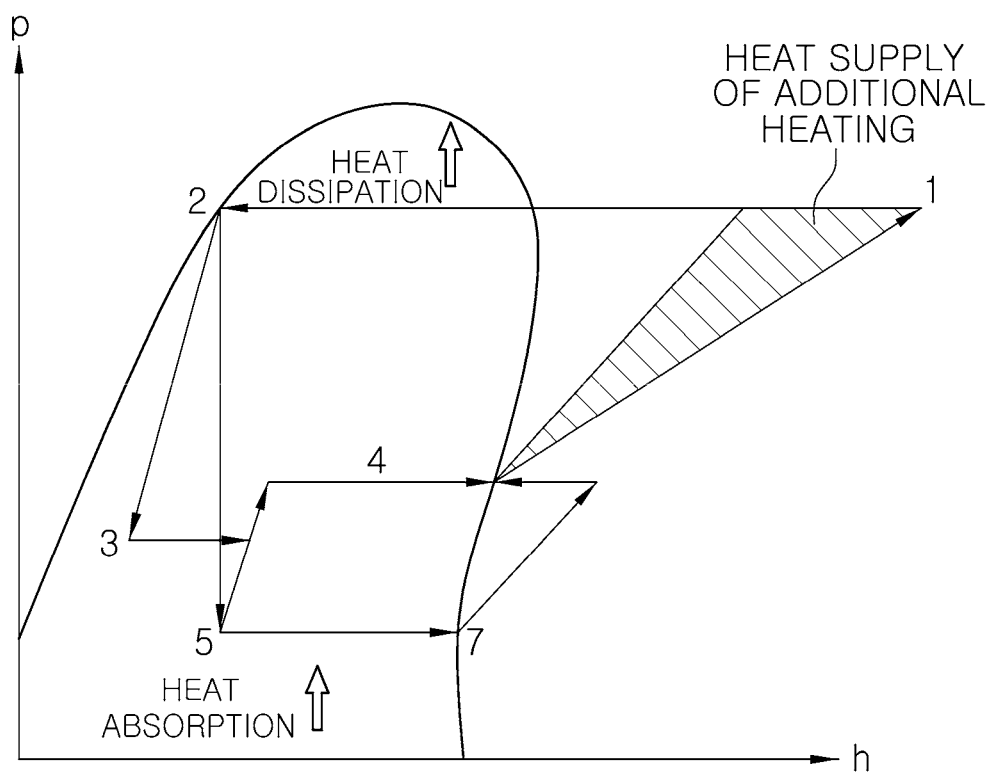
FIG. 9 is a P-h graph illustrating the thermal management system including an ejector according to still another embodiment of the present disclosure.

FIG. 8 is a circuit diagram of the thermal management system for a vehicle including an ejector 200 according to still another embodiment of the present disclosure, and FIG. 9 is a P-h graph illustrating the thermal management system including the ejector 200 according to still another embodiment of the present disclosure.

Referring to FIGS. 8 and 9, the thermal management system including an ejector 200 according to still another embodiment of the present disclosure may use a recycling-type cycle which additionally secures an amount of indoor heat dissipation.

More specifically, a recycle line 600 which branches between the compressor 110 and the condenser 120 of the main refrigerant line 100 or from the refrigerant increase line 500 and which joins to the first branch line 300 at an inlet of the nozzle 230 of the ejector 200 may be further included.

The recycle line 600 may be connected such that the refrigerant of a high temperature and high pressure passing through the compressor 110 of the main refrigerant line 100 and the refrigerant discharged from the ejector 200 of the refrigerant increase line 500 are injected into the nozzle 230 of the ejector 200 of the first branch line 300 again.

That is, when it is extremely low temperature and heat absorption is insufficient, due to the recycle line 600 which recirculates a portion of the refrigerant discharged from the compressor 110, there is an effect of additionally securing the amount of indoor heat dissipation (a heat supply of additional heating) through the condenser 120 using a load of the compressor 110.

In addition, an adjustment valve 190 for controlling a flow direction of the refrigerant is provided at a branching point from the main refrigerant line 100 to the first branch line 300. When the refrigerant flows through the recycle line 600, the adjustment valve 190 may block the flow of refrigerant from the main refrigerant line 100 to the first branch line 300.

The adjustment valve 190 may be a three-way valve and may adjust the flow direction at a branching point from the main refrigerant line 100 to the first branch line 300. In particular, in a mode in which the portion of the refrigerant discharged from the compressor 110 through the recycle line 600 recirculates, the adjustment valve 190 may be adjusted to prevent the refrigerant in the main refrigerant line 100 from flowing to the first branch line 300.

Figure 10:
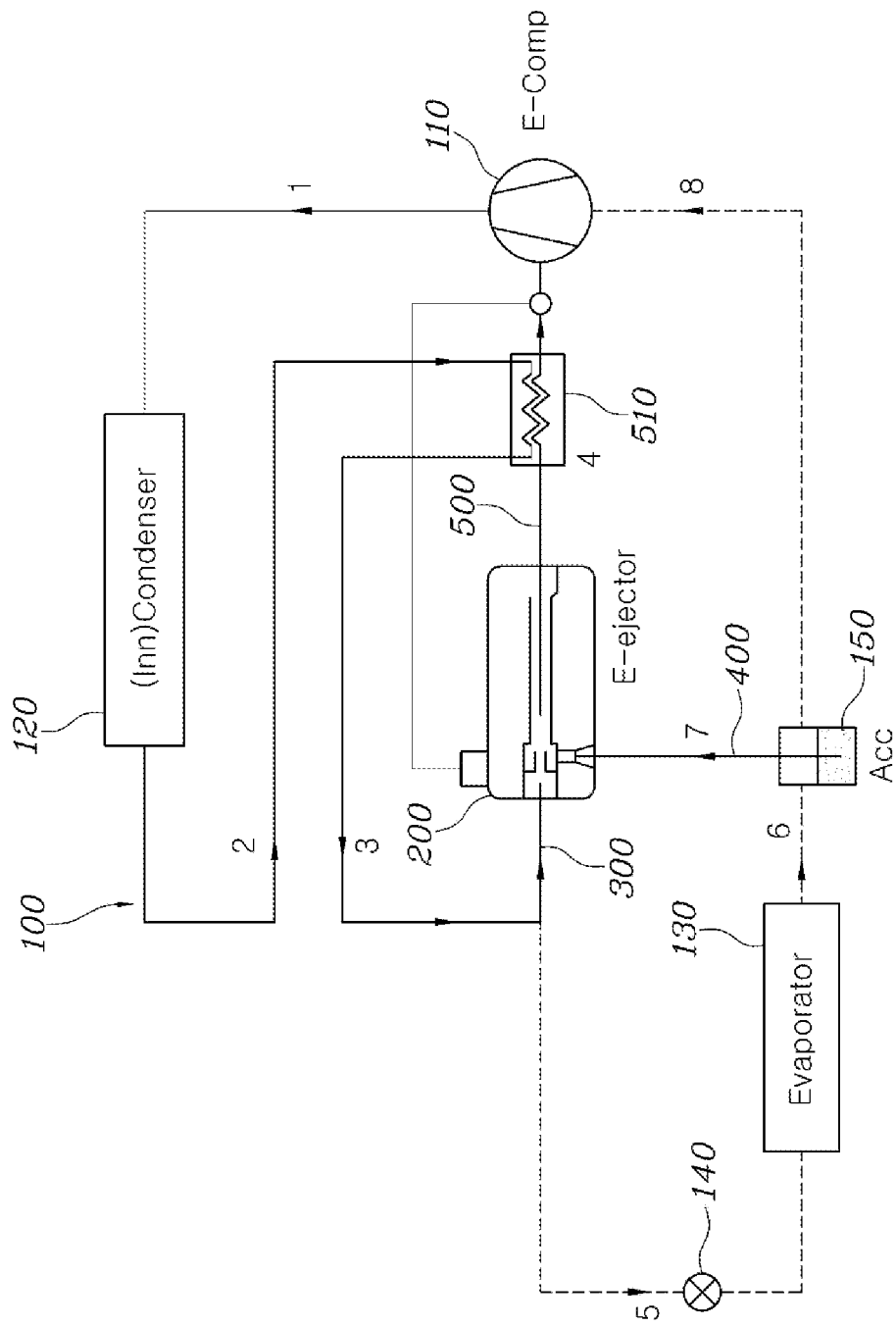
FIG. 10 is a circuit diagram illustrating a thermal management system for a vehicle including an ejector according to yet another embodiment of the present disclosure.
Figure 11:
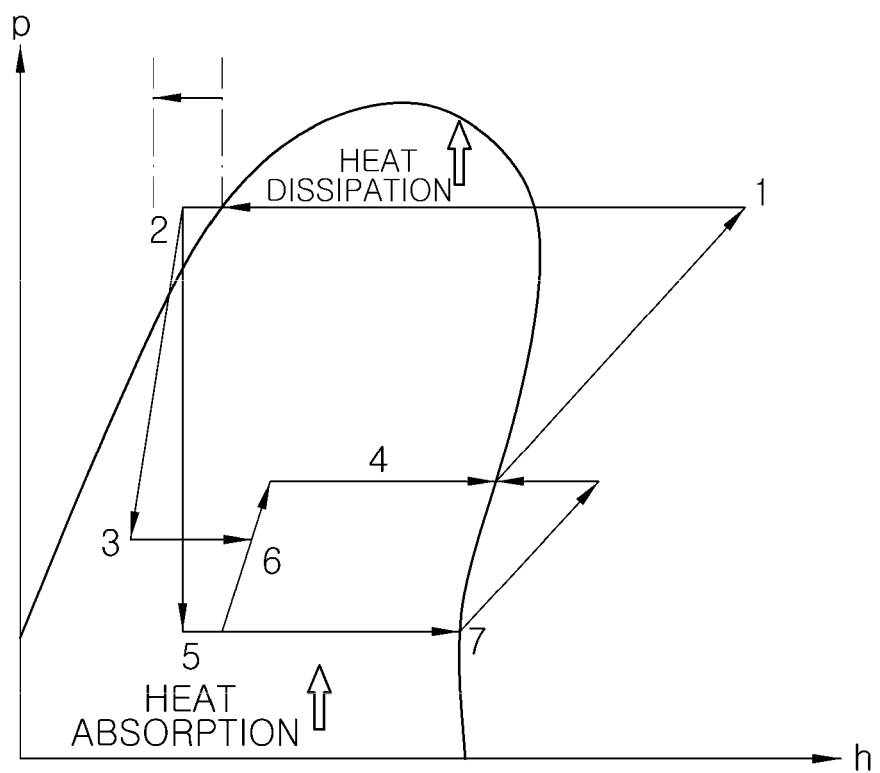
FIG. 11 is a P-h graph illustrating the thermal management system including an ejector according to yet another embodiment of the present disclosure.

FIG. 10 is a circuit diagram of the thermal management system for a vehicle including an ejector 200 according to yet another embodiment of the present disclosure, and FIG. 11 is a P-h graph illustrating the thermal management system including the ejector 200 according to yet another embodiment of the present disclosure.

Referring to FIGS. 10 and 11, the thermal management system for a vehicle including the ejector 200 according to yet another embodiment of the present disclosure may include an internal heat exchange (IHX) type cycle using a heat exchanger 510.

Specifically, the main refrigerant line 100 at a point before branching to the first branch line 300 and the refrigerant increase line 500 at a point before joining into the compressor 110 may pass through the heat exchanger 510 disposed to be heat exchangeable with each other.

The heat exchanger 510 may be a device in which the main refrigerant line 100 at a point where the refrigerant passes through the condenser 120 before branching to the first branch line 300 is connected to be heat exchangeable with the refrigerant increase line 500 at a point where the refrigerant is discharged from the ejector 200 before joining to the compressor 110.

Due to heat exchange in the heat exchanger 510, the refrigerant passing through the condenser 120 in the main refrigerant line 100 may be additionally overcooled, and the refrigerant discharged from the ejector 200 in the refrigerant increase line 500 may be heated.

Accordingly, since the remaining heat amount of the refrigerant condensed in the condenser 120 is supplied to the refrigerant discharged through the ejector 200, there is an effect of increasing a COP by reducing a compression ratio and power consumption (work) due to an increase in pressure. In addition, there is an effect of increasing the flow rate of the refrigerant to increase a heat amount of indoor heating through the condenser 120.

Figure 12:
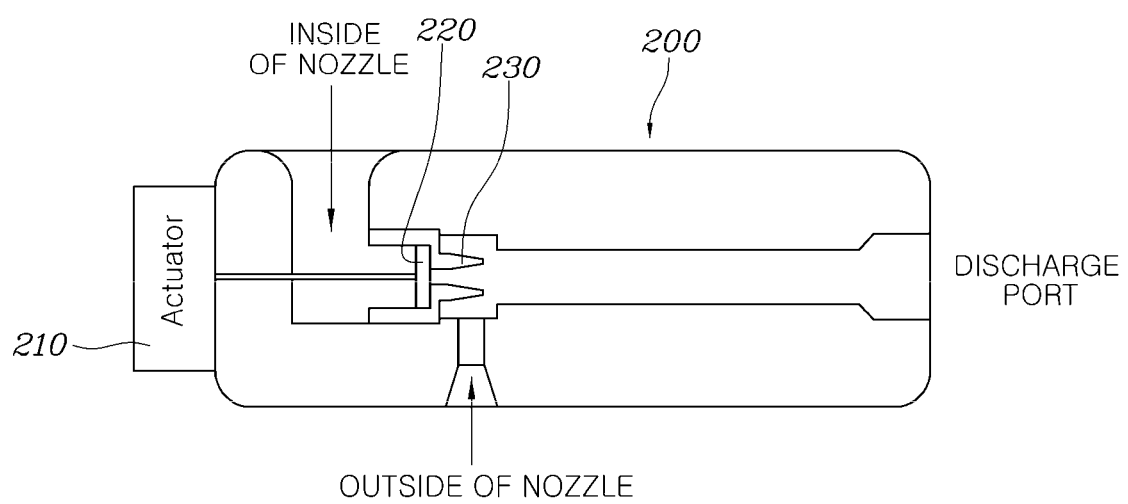
FIG. 12 is a cross-sectional view illustrating an ejector according to one embodiment of the present disclosure.
Figure 13:
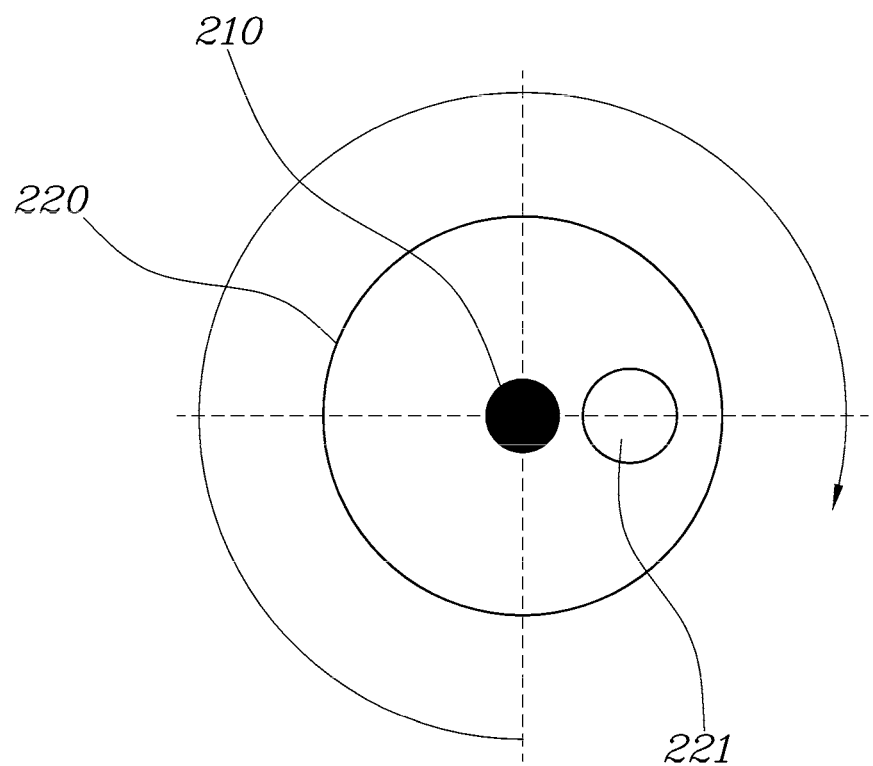
FIG. 13 is a diagram illustrating an adjustment plate of the ejector according to one embodiment of the present disclosure.
Figure 14:
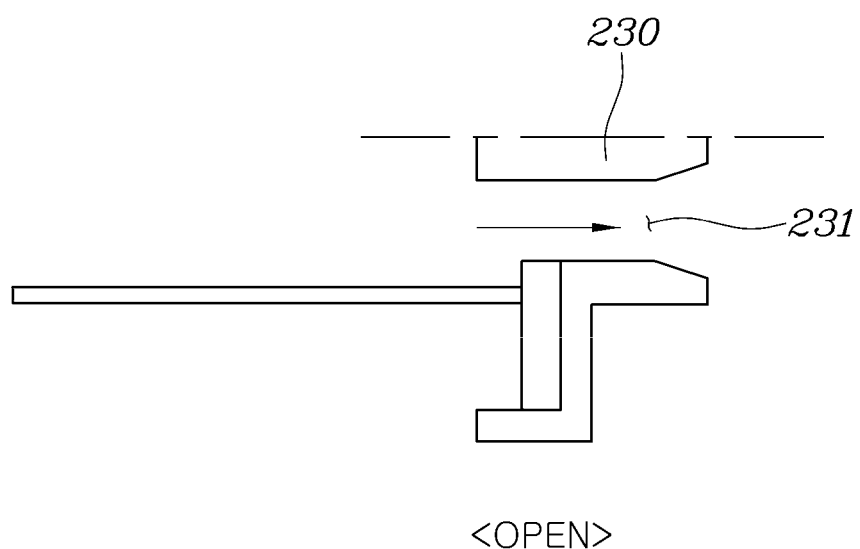
FIGS. 14 and 15 are diagrams illustrating an operating state of the ejector according to one embodiment of the present disclosure.
Figure 15:
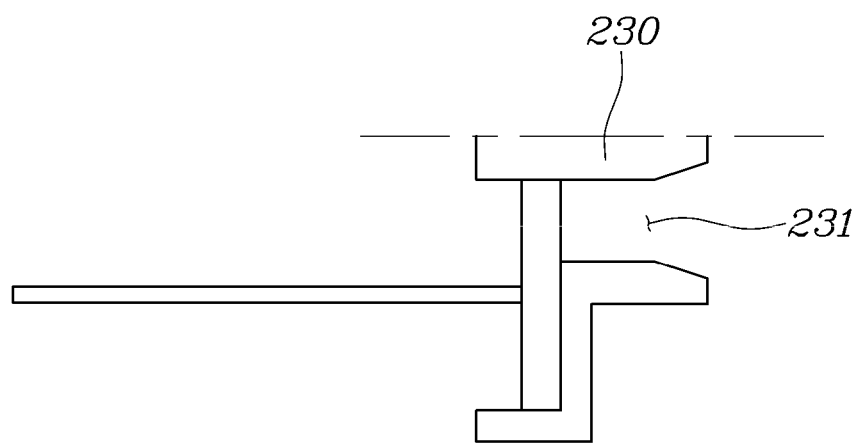

FIG. 12 is a cross-sectional view illustrating an ejector 200 according to one embodiment of the present disclosure, FIG. 13 is a diagram illustrating an adjustment plate 220 of the ejector 200 according to one embodiment of the present disclosure, and FIGS. 14 and 15 are diagrams illustrating an operating state of the ejector according to one embodiment of the present disclosure.

Referring to FIGS. 12 to 14, the ejector 200 may be an electric ejector 200 in which an opening degree amount of the nozzle 230 may be adjusted by driving of an actuator 210.

More specifically, the ejector 200 may be an electric ejector 200 in which the opening degree of the nozzle 230 is adjusted by the actuator 210. As one example, the adjustment plate 220 rotated by the actuator 210 may be provided in the nozzle 230, and an open hole 221 may be formed in the adjustment plate 220. In addition, as shown in FIGS. 13 and 14, a center of an opening of the nozzle 230 may be disposed to be spaced from a rotation axis of the actuator 210. That is, the opening degree of the nozzle 230 may be adjusted due to a relative rotation between the open hole 221 of the adjustment plate 220 and the opening of the nozzle 230 by the actuator 210.

Accordingly, a suction speed of the ejector 200 and a pressure of the refrigerant may be adjusted due to the operation of the actuator 210.

In addition, a controller (not shown) for controlling operations of the actuator 210, the compressor 110, the expansion valve 140, and the adjustment valve 190 may be further included. A controller (not shown) according to an exemplary embodiment of the present disclosure may be implemented through an algorithm configured to control operations of various components of the vehicle, a non-volatile memory (not shown) configured to store data relating to software commands to reproduce the algorithm, or a processor (not shown) configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in the form of one or more processors.

In accordance with a thermal management system for a vehicle including an ejector of the present disclosure, since a compression recovery function is generated according to the venturi effect of the ejector and thus power consumption (work) of the compressor is reduced, a coefficient of performance (COP) of the refrigeration cycle can be increased and an additional refrigerant can be introduced so that there is an effect of increasing a flow rate of the refrigerant when compared to the general refrigeration cycle.

Although specific embodiments of the present disclosure have been described and illustrated, those skilled in the art will appreciate that various alternations and modifications are possible without departing from the technical spirit of the present disclosure as disclosed in the appended claims.

The invention claimed is:

1. A thermal management system for a vehicle including an ejector, comprising:
   a main refrigerant line configured to allow a refrigerant to sequentially circulate through a compressor, a condenser, and an evaporator;
   a first branch line which branches between the condenser and the evaporator of the main refrigerant line, and which is connected to an inside of the nozzle of the ejector;
   a second branch line which branches between the evaporator and the compressor of the main refrigerant line, and which is connected to an outside of the nozzle of the ejector; and
   a refrigerant increase line which is connected to an outlet of the ejector, and which joins to the main refrigerant line through the compressor;

wherein the main refrigerant line comprises a first chiller connected to the evaporator in parallel so as to bypass the evaporator and configured to exchange heat with cooling water of a first cooling circuit; and wherein the refrigerant increase line comprises a second chiller in which the refrigerant discharged from the outlet of the ejector exchanges heat with cooling water of a second cooling circuit.

2. The thermal management system of claim 1, wherein:
a gas-liquid separator is positioned between the evaporator and the compressor of the main refrigerant line; and
the second branch line branches from the gas-liquid separator of the main refrigerant line.

3. The thermal management system of claim 2, wherein:
the refrigerant in a gas phase separated in the gas-liquid separator flows to the main refrigerant line;
the refrigerant of a liquid phase separated in the gas-liquid separator or the refrigerant in a mixed state of a liquid phase and a gas phase flows in the second branch line.

4. The thermal management system of claim 1, wherein the compressor of the main refrigerant line is a compressor for two-stage compression, in which the refrigerant in a gas phase is additionally injected into an intermediate compression region and the refrigerant is mixed.

5. The thermal management system of claim 1, further comprising:
a recycle line which branches between the compressor and the condenser of the main refrigerant line, or branches from the refrigerant increase line and joins to the first branch line at an inlet of the nozzle of the ejector.

6. The thermal management system of claim 5, wherein:
an adjustment valve for controlling a flow direction of the refrigerant is provided at a branching point from the main refrigerant line to the first branch line; and
when the refrigerant flows through the recycle line, the adjustment valve blocks a flow of the refrigerant from the main refrigerant line to the first branch line.

7. The thermal management system of claim 1, wherein the main refrigerant line at a point before branching to the first branch line, and the refrigerant increase line at a point before joining to the compressor, pass through a heat exchanger in which the main refrigerant line and the refrigerant increase line exchange heat with each other.

8. The thermal management system of claim 1, wherein the ejector is an electric ejector in which an opening degree amount of a nozzle is adjustable due to driving of an actuator.

* * * * *